(12) United States Patent
Garside (10) Patent No.: US 9,320,941 B2
(45) Date of Patent: Apr. 26, 2016

(54) ARRANGEMENT FOR IMPARTING MOTION THROUGH COUNTER-ROTATION OF OPPOSING END TERMINATIONS OF ARCHED FLEXIBLE MEMBER

(71) Applicant: Ross Garside, Sunbury, PA (US)

(72) Inventor: Ross Garside, Sunbury, PA (US)

( * ) Notice: Subject to any disclaimer, the term of this patent is extended or adjusted under 35 U.S.C. 154(b) by 535 days.

(21) Appl. No.: 13/782,766

(22) Filed: Mar. 1, 2013

(65) Prior Publication Data

US 2013/0239711 A1    Sep. 19, 2013

Related U.S. Application Data (60) Provisional application No. 61/612,348, filed on Mar. 18, 2012.

(51) Int. Cl.
| | | |
|---|---|---|
| *A63B 27/00* | (2006.01) | |
| *A01M 31/02* | (2006.01) | |
| *A01G 23/08* | (2006.01) | |
| *F16H 19/02* | (2006.01) | |

(52) U.S. Cl.
CPC ............... *A63B 27/00* (2013.01); *A01M 31/02* (2013.01); *A01G 23/08* (2013.01); *F16H 19/025* (2013.01); *Y10T 74/18056* (2015.01)

(58) Field of Classification Search
CPC ...... A01M 31/00; A01M 31/02; A01G 23/08; A63B 27/00; E04G 3/24; E04G 3/28; F03D 1/003; Y10S 180/901
See application file for complete search history.

(56) References Cited

U.S. PATENT DOCUMENTS

| | | |
|---|---|---|
| 3,237,720 A | 3/1966 | Landqvist |
| 3,520,383 A | 7/1970 | Loock |
| 4,428,459 A | 1/1984 | Peck |
| 4,595,076 A | 6/1986 | Gober |
| 4,802,552 A | 2/1989 | Williams |
| 4,890,694 A | 1/1990 | Williams |
| 5,086,874 A | 2/1992 | Treants |
| 5,097,925 A | 3/1992 | Walker, Jr. |
| 5,141,074 A | 8/1992 | Sulowski et al. |
| 5,379,861 A | 1/1995 | Amacker |
| 5,584,358 A | 12/1996 | Stone et al. |
| 5,642,789 A | 7/1997 | Maxwell |
| 5,647,454 A | 7/1997 | Fehr |
| 6,264,000 B1 | 7/2001 | Johnson |
| 6,267,202 B1 | 7/2001 | Nelson |
| 6,595,325 B2 | 7/2003 | Ulrich |
| 6,644,438 B1 | 11/2003 | Chang et al. |

(Continued)

FOREIGN PATENT DOCUMENTS

DE    2617769    * 11/1977    ............. A63B 27/00

*Primary Examiner* — Colleen M Chavchavadze
(74) *Attorney, Agent, or Firm* — Wendy W. Koba (57) ABSTRACT

An arrangement for imparting translational movement of a load with respect to a columnar structure that takes the form of at least one flexible elastic member (e.g., bungee cord) that is disposed to surround a portion of the structure and a platform coupled to the opposing ends of the flexible elastic member. The platform is used to support the load and the ends of the flexible member are coupled to the platform in a manner such that the ends are free to rotate. Thus, the application of counter-rotational forces to these opposing end terminations will impart a tension to the flexible elastic member that ultimately causes the flexible member to flip over to relieve the tension. By continuing to apply the counter-rotational forces, the flexible member will continue to flip, and progress in translational movement along the columnar structure.

8 Claims, 7 Drawing Sheets

(56) References Cited

U.S. PATENT DOCUMENTS

| | | |
|---|---|---|
| 6,662,903 B2 | 12/2003 | Johnson |
| 6,698,549 B2 | 3/2004 | Graham, Jr. et al. |
| 6,948,589 B2 | 9/2005 | Johnson |
| 6,959,786 B2 | 11/2005 | Craft |
| 7,156,206 B2 | 1/2007 | Prejean |
| 7,287,623 B2 | 10/2007 | Graham, Sr. |
| 7,306,074 B2 | 12/2007 | Voorhies |
| 7,497,302 B2 | 3/2009 | Boice et al. |
| 7,552,798 B2 | 6/2009 | Swierski et al. |
| 7,802,653 B2 | 9/2010 | Louk et al. |
| 7,823,694 B2 | 11/2010 | Motes |
| 8,021,098 B2 | 9/2011 | Grenon |
| 8,132,648 B2 | 3/2012 | Tong |
| 2003/0178251 A1 | 9/2003 | Hewitt |
| 2005/0072631 A1 | 4/2005 | Tracey |
| 2005/0145436 A1 | 7/2005 | Prejean |
| 2009/0020361 A1* | 1/2009 | Teichert .................. 182/36 |
| 2012/0168252 A1* | 7/2012 | Bogaert .................. 182/142 |
| 2012/0325581 A1* | 12/2012 | Gunther et al. .......... 182/129 |

* cited by examiner

ARRANGEMENT FOR IMPARTING MOTION THROUGH COUNTER-ROTATION OF OPPOSING END TERMINATIONS OF ARCHED FLEXIBLE MEMBER

CROSS-REFERENCE TO RELATED APPLICATION

This application claims the benefit of U.S. Provisional Application No. 61/612,348, filed Mar. 18, 2012 and herein incorporated by reference.

TECHNICAL FIELD

The present invention relates to an arrangement for imparting motion through counter-rotation of opposing terminations of a flexible, elastic member and, more particularly, to imparting motion to the flexible member with respect to, for example, a columnar structure so as to use the flexible member to raise/lower attached components along the longitudinal axis of the columnar structure.

BACKGROUND OF THE INVENTION

There are many situations where a need arises to move a "load" along a columnar structure. For example, various maintenance and construction operations require workpieces to be raised up poles or ladders (e.g., mounting cameras on poles, changing lightbulbs in cathedral ceiling environments, attaching wireless communication equipment on towers, etc.). Utility workers themselves often need to climb poles to perform installation and repair work at elevated locations. Recreational activities may also require the need to move people or equipment into raised locations along a columnar structure (e.g., raising a deer stand into location in a tree).

The art is replete with various arrangements for performing these functions. These arrangements may require a large number of moving parts, or are not particularly well-suited for a variety of different purposes; that is, each individual situation has tended to develop its own, unique arrangement for moving loads along specific types of columnar structures.

Prior art arrangements that are designed for use with irregularly-shaped columnar structures (for example, trees) are configured to concentrate a load force upon a minimal number of points of contact. As a result, the traction associated with the arrangement is limited and may result in damaging the tree or other such structure.

Various prior art systems require the inclusion of some type of "brake", or used ground-attached booms. In either event, if the arrangement for stopping fails, the results may be catastrophic.

The arrangements used in an urban environment (such as, for example, to raising wireless equipment up a telephone pole) use separate support systems and require a large operating footprint (including a utility truck, for example), often resulting in street traffic being shut down in an area surrounding the work location.

Moreover, many prior art arrangements are very complex configurations, with a large number of separate components, thus resulting in expensive solutions that are often very heavy and may provide more opportunities for catastrophic failure.

SUMMARY OF THE INVENTION

The needs remaining in the prior art are addressed by the present invention, which relates to an arrangement for imparting motion through counter-rotation of opposing terminations of a flexible, elastic member and, more particularly, to imparting motion to the flexible member with respect to, for example, a columnar structure so as to use the flexible member to raise/lower attached components along the longitudinal axis of the columnar structure.

In one particular embodiment, the present invention describes an arrangement for imparting translational movement of a load with respect to a columnar structure that takes the form of at least one flexible elastic member (e.g., bungee cord) that is disposed to surround a portion of the structure. A platform (or any other suitable type of load container) is coupled to the opposing ends of the flexible elastic member. The platform is used to support the load and the ends of the flexible member are coupled to the platform in a manner such that the ends are free to rotate. Thus, the application of counter-rotational forces to these opposing end terminations will impart a tension to the flexible elastic member that ultimately causes the flexible member to flip over to relieve the tension. By continuing to apply the counter-rotational forces, the flexible member will continue to flip, and progress in translational movement along the columnar structure.

Other and further features and advantages of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

In accordance with the present invention, the application of counter-rotational forces (torque) to the opposing ends of a flexible member that is positioned to surround at least a portion of a columnar structure creates a helical torsion moment along the arcuate (i.e., arched) shape of the flexible member. As will be explained in detail below, this helical torsion moment then translates into linear movement of the flexible member (with respect to the longitudinal axis of the columnar member).

Figure 1:
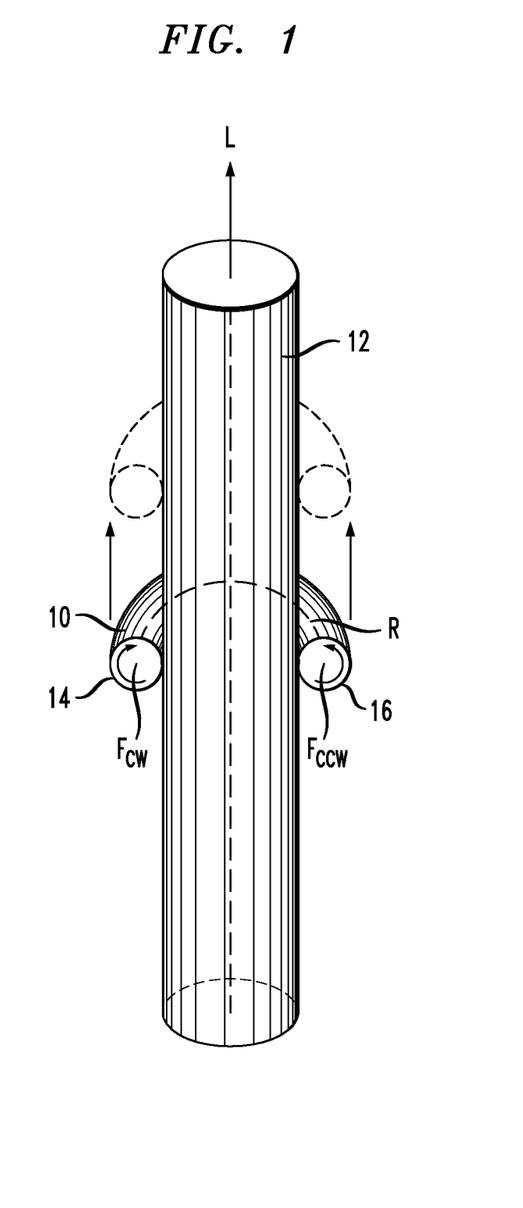
FIG. 1 is an isometric view of an exemplary flexible member and columnar structure, useful for understanding the principles of the present invention.

FIG. 1 is a basic, simplified diagram illustrating the principles of the present invention. In this exemplary arrangement, a flexible member 10 is disposed to surround a portion of a columnar structure 12. Flexible member 10 may comprise, for example, a bungee cord, a section of rope (or other fibrous material) with sufficient elasticity to react to a torque moment, a chain-like segmented linkage or a spring—again, where the linkage or spring has sufficient elasticity to react to a torque moment. Indeed, a spring may be formed in arcuate form, as shown in FIG. 1. Regardless of the specific material choice for flexible member 10, its important quality is to exhibit a torque moment rotation reaction. While not specifically shown in FIG. 1, it is to be understood that flexible member 10 is to be disposed in a tensioned state with respect to columnar structure 12. That is, some type of fixturing (e.g., ratchet, engagement, etc.) is created between end terminations 14 and 16 of flexible member 10 in order to hold member 10 in place along columnar structure 12. This feature is particularly advantageous, as described below, in providing a "braking" force to flexible member 10, preventing flexible member 10 from slipping when not in motion.

Referring to FIG. 1, the ability to impart motion to flexible member 10 with respect to columnar structure 12 will now be described. As shown and in particular, a clockwise rotational force $F_{CW}$ is applied to first end termination 14, while a counterclockwise rotation force $F_{CCW}$ is simultaneously applied to second end termination 16. These rotational forces will continue to build up potential energy along the lateral extent of flexible member 10 (that is, along its radius of curvature R), as the force is continued to be applied. At a given point in time, the torsion moment of flexible member 10 will be overcome, causing flexible member 10 to "flip", converting the stored potential energy into kinetic energy in the form of translational movement of flexible member 10 with respect to longitudinal axis A of columnar structure 12.

That is, by applying a clockwise force at end termination 14 and a counterclockwise force at end termination 16, the release of kinetic energy will result in translating flexible member 10 upward, as shown by the arrows in FIG. 1, moving flexible member 10 into the new, translated location as shown in phantom. As described, flexible member 10 does not merely "translate" while retaining its same orientation, rather, the release of the torsion moment causes flexible moment to essentially "flip over", resulting in the upward movement.

By expending the kinetic energy associated with the translational movement to the new location, flexible member 10 is again at "rest", with no energy remaining within the member. Thus, the application of forces to end terminations 14, 16 in the same manner as described above will again cause flexible member 10 to store potential energy until the moment is again overcome, and flexible member 10 "flips" upward again, translating along longitudinal axis L of columnar structure 12 into a new position. Advantageously, this inventive arrangement provides a natural "brake" in terms of preventing flexible member 10 from slipping downward in the absence of the application of counter-rotational forces on the end terminations of the flexible member.

It is to be understood that while the above explanation describes the use of a clockwise rotational force applied to first end termination 14 and a counterclockwise rotational force applied to second end termination 16, the opposite arrangement may be used to move flexible member 10 downward. That is, a counterclockwise rotational force may be applied to first end termination 14 and a clockwise rotational force applied to second end termination 16. As long as the pair of applied forces are counter-rotational, flexible member 10 will be translated longitudinally with respect to columnar structure 12. Thus, it can be seen that a continuous application of counter-rotational forces (i.e., both clockwise and counter-clockwise) will result in continuous movement of flexible member 10 with respect to columnar structure 12.

Figure 2:
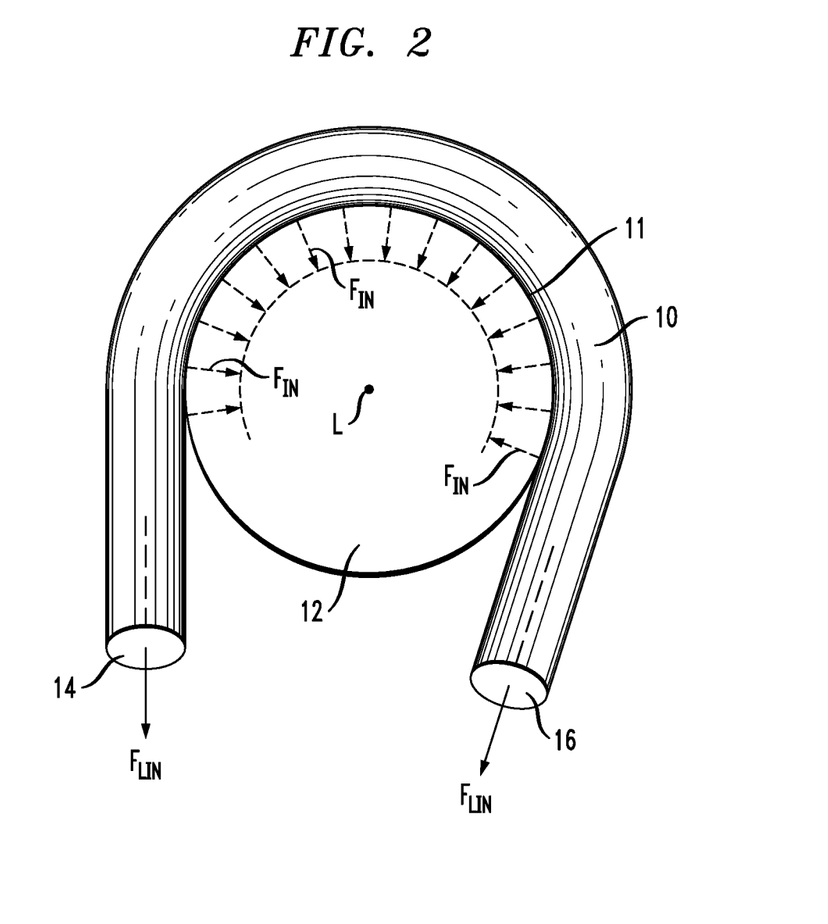
FIG. 2 is a top view of the arrangement of FIG. 1.

FIG. 2 is a top view of the arrangement of FIG. 1, illustrating the particular forces that are at work in providing the translational movement of a flexible member with respect to a columnar structure. In particular, FIG. 2 shows a large contact area between flexible member 10 and columnar structure 12, indicated by the shaded portion 11 of flexible member 10. Distributed inward tension force $F_{in}$ as shown along this contact area 11 is the result of the linear tensions created by holding flexible member 10 in a tensioned state with respect to columnar structure 12, as mentioned above. This linear tension is shown as $F_{LIN}$ at end terminations 14 and 16. Indeed, this linear tension is the force that holds flexible member 10 in place in the absence of the application of counter-rotational forces. By virtue of having such a relatively large contact area between flexible member 10 and columnar structure 12 (i.e., shaded region 11), the linear tension will act as a "braking" force and maintain the position of flexible member 10 along columnar structure 12.

In accordance with the present invention and as described in detail below, distributed force $F_{in}$, when rotated, becomes the drive force that results in "flipping" flexible member 10 and allowing for the translational movement of flexible member 10 with respect to columnar structure 12.

Figure 3:
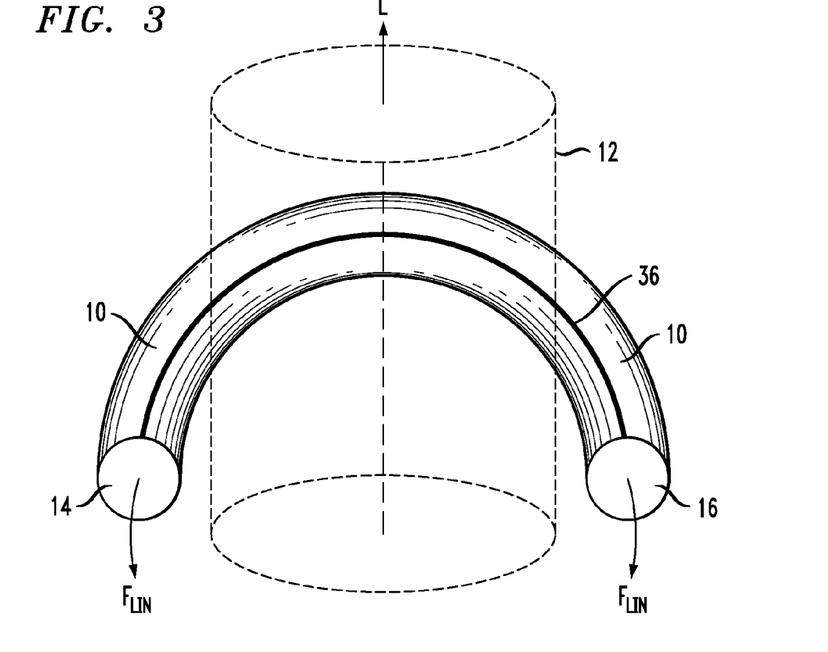
FIG. 3 is an isometric view of a portion of FIG. 1, illustrating the location of a stress line along the flexible member with respect to the columnar structure.
Figure 4:
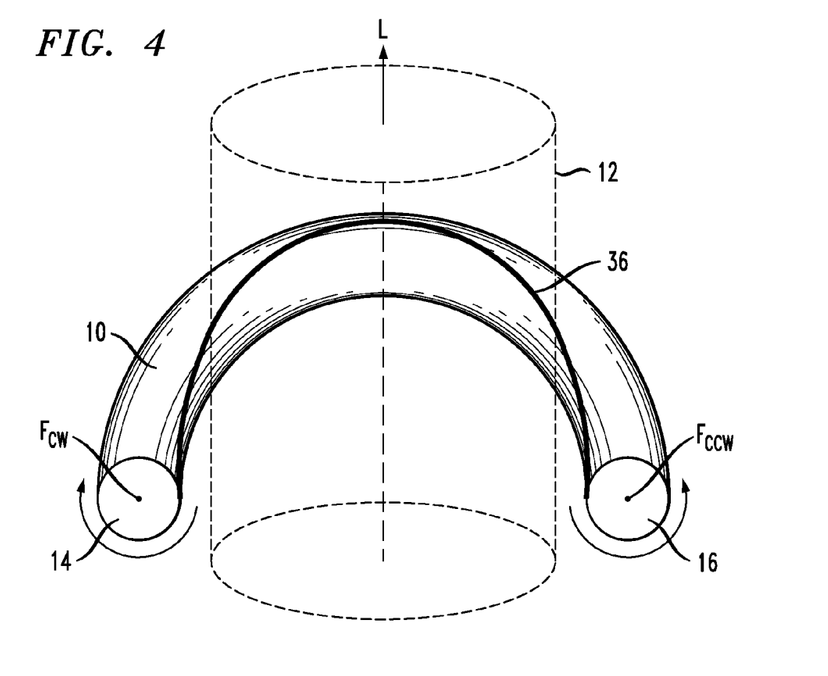
FIG. 4 is a view of the same arrangement as shown in FIG. 3, in this case where counter-rotational forces have been applied to the flexible member and the stress line has moved accordingly.

FIGS. 3 and 4 further illustrate the utilization of these forces along flexible member 10 to cause its movement with respect to columnar structure 12. In particular, FIG. 3 illustrates flexible member 10 in a "relaxed" state in position with respect to columnar structure 12. This may be the state immediately after flexible member 10 has flipped, or its initial position before any counter-rotational forces have been applied. Line 36 along flexible member 10 defines its stress line, and shows the line to be orthogonal to columnar structure 12; indicative of the presence of only the linear tension forces on flexible member 10.

FIG. 4 shows the distortion change in stress line 36 when forces $F_{CW}$ and $F_{CCW}$ are applied to end terminations 14, 16 of flexible member 10. Indeed, the arched central region of stress line 36 illustrates the increase of inward tension force $F_{in}$, where it encounters resistance against columnar structure 12. This distortion shows evenly-distributed and smoothed potential energy storage throughout the arch, which minimizes the peak torque force required to move flexible member 10 along columnar structure 12 and ultimately allows for the torsion moment to be overcome, releasing the potential energy and causing flexible member 10 to flip and move.

Figure 5:
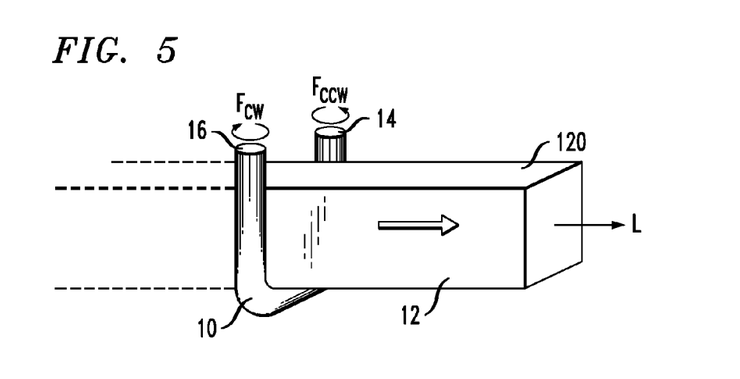
FIG. 5 illustrates another embodiment of the present invention, in this case associated with providing relative horizontal movement between the flexible member and the columnar structure.

While the particular arrangement of FIG. 1 illustrates columnar structure 12 as being disposed in a vertical orientation, this should only be considered as exemplary. Indeed, columnar structure 12 may be disposed in a horizontal orientation, with flexible member 10 controlled to move either left or right by the application of counter-rotational forces. FIG. 5 illustrates this embodiment of the present invention. In this case, a counterclockwise rotational force $F_{ccw}$ is applied to first end termination 14 and a clockwise rotational force $F_{cw}$ is applied to second end termination 16, resulting in columnar structure 120 moving to the right with respect to flexible member 10. In any case, relative motion between the two elements (flexible member and columnar structure) will occur, where either element may actually be in motion. Obviously, other orientations of columnar structure 12 (e.g., at 45° with respect to the horizon) may exist and will not impact the ability to use flexible member 10 to move a load therealong.

It is to be noted that in the specific embodiment shown in FIG. 5, columnar structure 120 takes the form of a squared-off beam (as opposed to the rounded, cylindrical profile of columnar structure 12 of FIG. 1). Indeed, it is to be understood that the columnar structure may take a variety of forms, including "natural"/irregular columnar structures such as trees.

With this basic understanding of the principles of the present invention, it is evident that there are many different applications for this type of movement-imparting arrangement.

Figure 6:
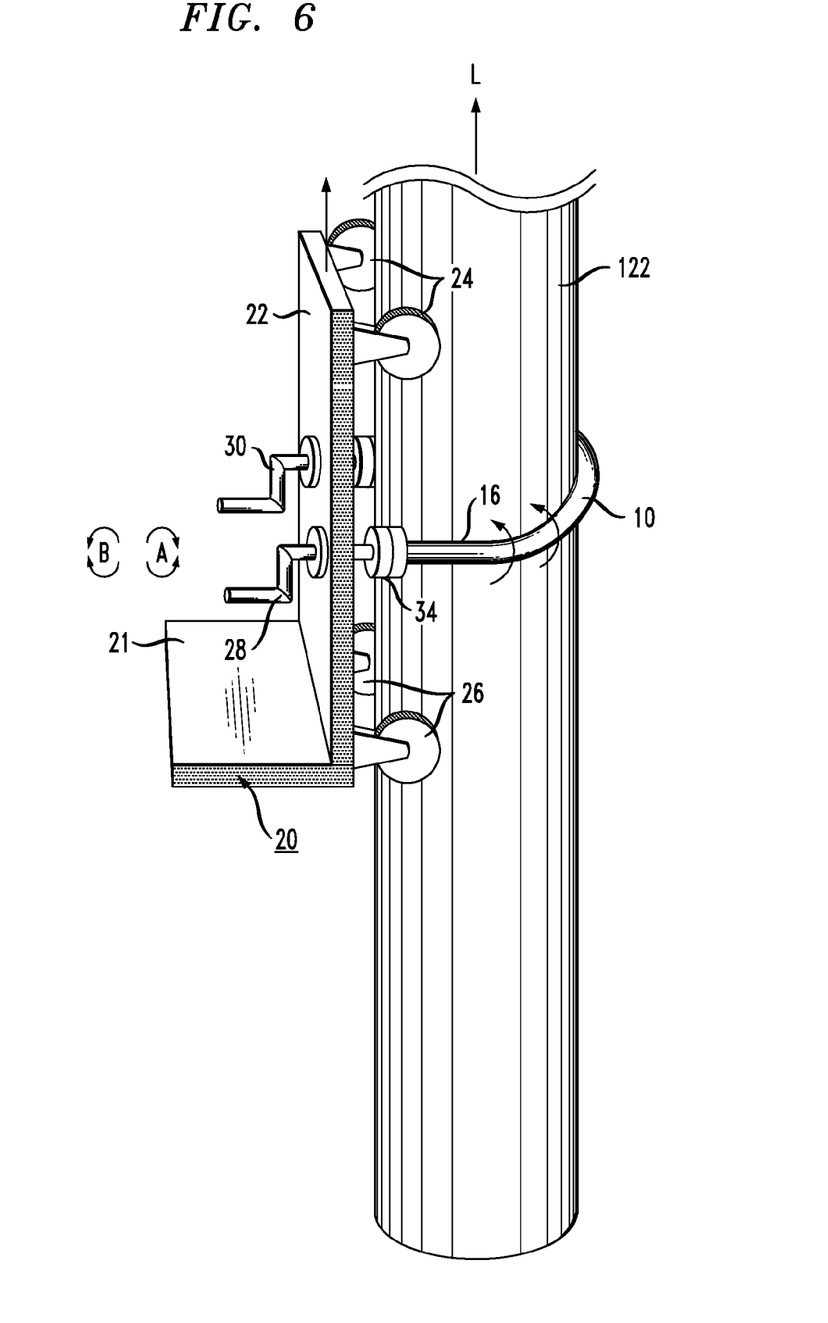
FIG. 6 illustrates a complete arrangement utilizing the flexible member's translational movement properties, in this case illustrating the movement of an attached platform along a columnar structure.
Figure 7:
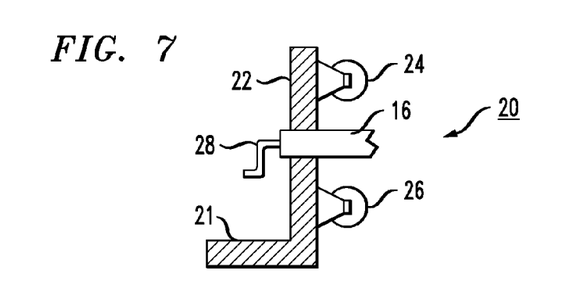
FIG. 7 is a side view of the platform shown in FIG. 6.

FIG. 6 illustrates, in conceptual form, an embodiment of the present invention as used to raise a load in an upward direction along a columnar structure taking the form of a pole 122. This is an isometric view, showing an exemplary arrangement for using flexible member 10 to raise a platform 20 upward along pole 122. FIG. 7 is a side view of platform 20 and FIG. 8 is a front view of platform 20.

Figure 8:
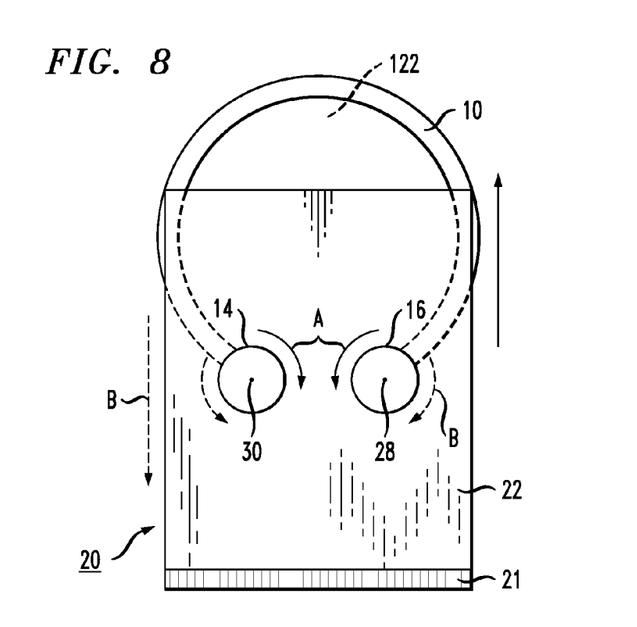
FIG. 8 is a front view of the platform shown in FIG. 6.

Referring to FIGS. 6-8, platform 20 includes a floor portion 21 and a sidewall portion 22. Platform 20 further comprises at least one translation member (in this case a pair of wheels 24, 26) attached to the backside of sidewall portion 22 so as to rest against pole 122. In accordance with this embodiment of the present invention, translational movement of platform 20 with respect to pole 122 is provided by a means for imparting counter-rotation forces to flexible member 10 that takes the form of a pair of crank handles 28, 30 that are attached (through the thickness of sidewall 22) to end terminations 14, 16 of flexible member 10. Crank handles 28, 30 are used as a means to impart the counter-rotational forces to flexible member 10, providing the translation movement as described above. That is, by turning the handles in a clockwise/counterclockwise pairing, a counter-rotational force will be applied to flexible member 10, eventually causing flexible member 10 to "flip" and translate along pole 122. Inasmuch as platform 20 is connected to flexible member 10, platform 20 will also be translated, as well as any "load" that is placed on platform 20. It is to be understood that while this particular configuration utilizes a platform to move a load, any suitable type of container or properly-formed load may be coupled to flexible member 10 and moved in the inventive manner.

With particular reference to FIG. 8, it is shown that when crank handles 28, 30 are rotated "inward" (shown by arrows "A", with crank handle 30 rotating clockwise and crank handle 28 rotating counterclockwise), the imparted tension to flexible member 10 will cause member 10 to "flip" upward, raising platform 20 as indicated by the "up" arrow in FIG. 8. Conversely, when crank handles 28, 30 are rotated "outward" (shown by arrows "B", with crank handle 30 rotating counterclockwise and crank handle 38 rotating clockwise), the imparted tension to flexible member 10 will cause member 10 to "flip" downward, lowering platform 20 as indicated by the "down" arrow in FIG. 8.

While the embodiment shown in FIGS. 6-8 illustrates the use of a pair of crank handles to impart this counter-rotational force, it is to be understood that any other suitable drive mechanism may be used. For example, a remotely-controlled motor may be used to create and provide the desired counter-rotational forces to end terminations 14, 16 of flexible member 10. A tether-driven arrangement may also be used in place of a remote configuration. In general, the scope of the present invention is understood to not be limited by the arrangement used to apply the force to the flexible member.

Additionally, while the embodiment as shown in FIGS. 6-8 illustrates the use of a single flexible member to create the relative motion between the platform and the pole, other configurations of the present invention may use a multiple number of flexible members that work in combination to move loads. The tandem arrangement of multiplex flexible members can take a variety of different forms, including having a multiple number of flexible members attached to a single platform sidewall or each flexible member attached to a separate platform sidewall, or any combination thereof.

Figure 9:
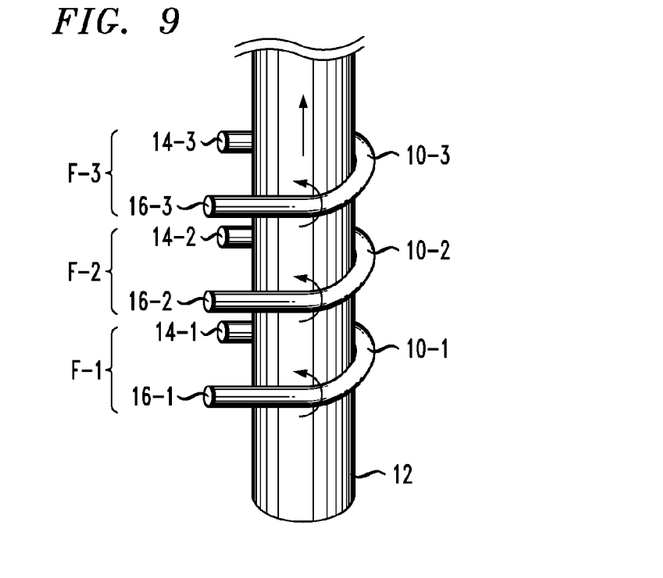
FIG. 9 illustrates yet another embodiment of the present invention, in this case utilizing a plurality of flexible members that are used in a collective manner to provide a drive force for an attached load (the load not shown in the diagram)

FIG. 9 is a side view of an exemplary set of three flexible members 10-1, 10-2 and 10-3, as positioned on pole 122, where these three members may be attached to a single platform sidewall (not shown) and operated simultaneously to provide a larger, stronger force for translational movement. Additionally, the use of multiple flexible members is considered to improve the safety of the structure, since if any one flexible member breaks, the remaining members are able to continue to support the attached load. It is contemplated that a single pair of counter-rotational forces may be used with this embodiment, with the single pair used to simultaneously rotate all three flexible members. However, it is also possible to individually control each flexible member with its own pair of counter-rotational forces, shown as F-1, F-2 and F-3 in FIG. 9.

As noted above, one feature of the arrangement of the present invention is its ability to provide translation movement along an oddly-shaped columnar structure (such as a tree). A tree, or any kind of pole, may include protuberances along its surface of many kinds (i.e., a knot in a tree, a directional plate screwed in place on a pole, etc.). The nature of the "flip" movement of the flexible member of the present invention, in conjunction with the elasticity of the flexible member, allows it to accommodate the presence of these irregularities and continue with its translational movement.

Figure 10:
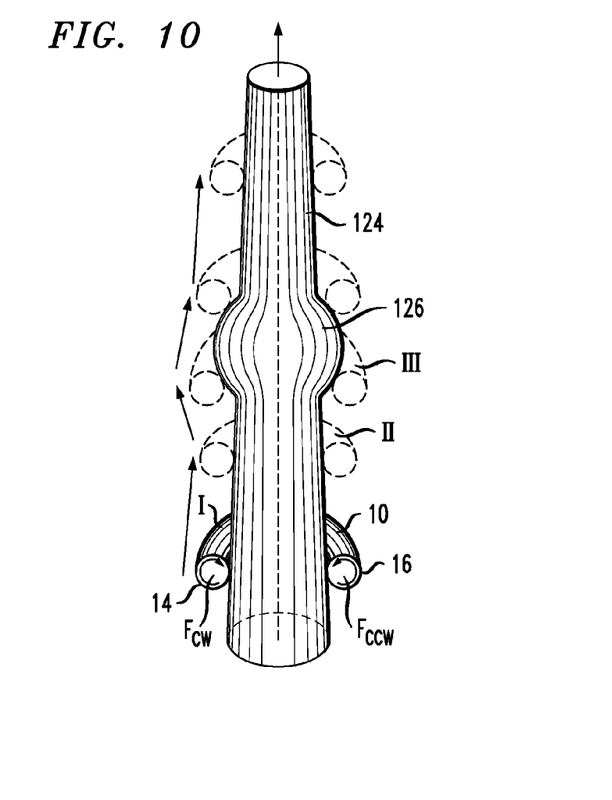
FIG. 10 illustrates the capability of the flexible member of the present invention to provide translational along an irregularly-shaped columnar structure.

FIG. 10 illustrates this aspect of the present invention, showing the upward movement of flexible member 10 along a pole 124 that includes an outward bulge section 126. As before, a clockwise force is applied to end termination 14 of flexible member 10 and a counterclockwise force is applied to end termination 16 of flexible member 10, which will initially result in flexible member 10 "flipping" from position I to position II. At this point, all of the kinetic energy has been used, and the application of additional clockwise/counterclockwise force will result in flexible member 10 again flipping upward into position III. Since flexible member 10 also had to expand to accommodate the presence of bulge 126, some of the energy was expended in this movement, and the actual lateral translation of the attached load (not shown) is slightly less than that associated with the first movement from position I to position II.

Continuing in the same manner and with further reference to FIG. 10, the counter-rotational forces are applied to flexible member 10, where in this case an additional amount of force may be necessary to assist in overcoming the additional barrier to movement created by the presence of bulge 126. At some point, however, a sufficient amount of force will be built up within flexible member 10, and it will flip from position III to position IV. Thereafter, the translation movement proceeds unimpeded.

Figure 11:
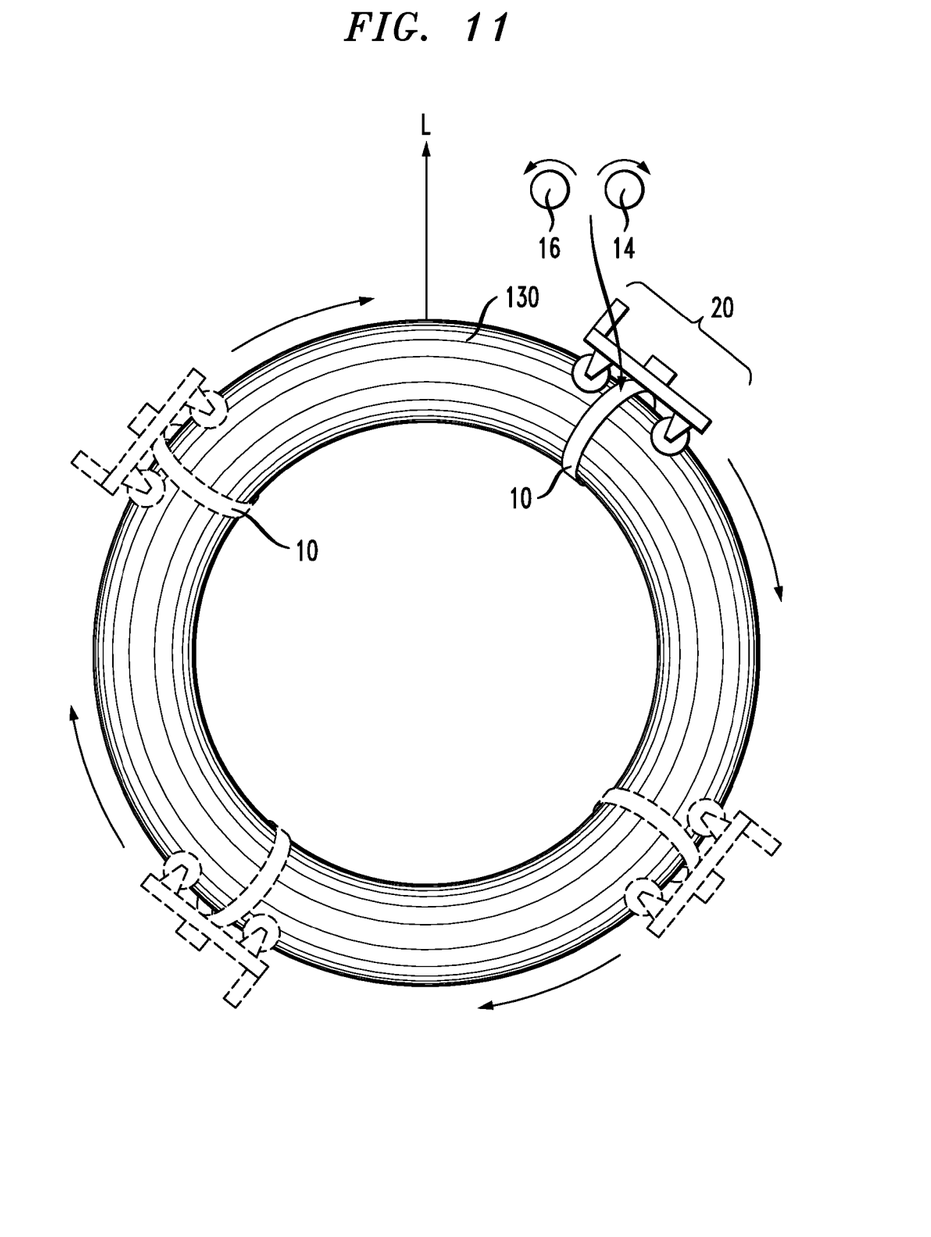
FIG. 11 shows yet another arrangement using the present invention, in this case where the columnar structure comprises a toroidal shape, such that the flexible member imparts a rotational movement of a platform around the toroid.

FIG. 11 illustrates yet another embodiment of the present invention, in this case where the columnar structure takes on the form of a toroid instead of a linear structure. In this case, the application of counter-rotational forces to end terminations 14, 16 of flexible member 10 will translate platform 20 around the circular configuration of toroidal structure 130. The movement of platform 20 to various locations is shown in phantom in FIG. 11. Clearly, the use of counter-rotational forces applied to a flexible member, in accordance with the present invention, results in imparting motion of an attached load in a variety of different embodiments.

Thus, as readily apparent from the above description, the arrangement of the present invention is a fundamentally new and basic type of drive technology. Thus, it is contemplated that any type of attached devices (such as the "platform" described above) can be utilized—indeed, the subject matter of the present invention finds uses in moving many types of loads within arrangements such as, but not limited to, portable and fixed elevators, lift platforms, pole and pipeline construction and maintenance, multi-directional platforms, replacements for stairways, scaffolding, ladders, tree climbers, etc.

Indeed, the above description is intended only to describe various aspects and features of the present invention and is not intended to be limiting in terms of details or applications for the device of the present invention. All of the details, applications and aspects are considered to fall within the spirit and scope of the present invention, as particularly defined by claims appended hereto.

What is claimed is:

1. An arrangement for imparting translational movement of a load with respect to a structure associated therewith, the arrangement comprising
    at least one flexible elastic member disposed to surround a portion of the structure, the flexible elastic member defined as having opposing end terminations; and
    a platform coupled to the opposing ends of the flexible elastic member and used to support the load, the platform including means for imparting counter-rotational forces to the opposing end terminations of the flexible elastic member sufficient to impart a tension to the flexible elastic member that is relieved by causing the flexible elastic member to flip over and translate along the structure.

2. The arrangement as defined in claim 1 wherein the at least one flexible elastic member comprises a single flexible elastic member coupled to the platform.

3. The arrangement as defined in claim 1 wherein the at least one flexible elastic member comprises a plurality of flexible elastic members disposed in parallel.

4. The arrangement as defined in claim 3 wherein each flexible elastic member is separately controlled for receiving counter-rotational forces.

5. The arrangement as defined in claim 1 wherein the opposing end terminations of at least one flexible member are disposed to create a linear tension with respect to the columnar structure.

6. The arrangement as defined in claim 5 wherein the linear tension is sufficient to maintain the position of the at least one flexible member with respect to the columnar structure in the absence of counter-rotational forces.

7. The arrangement as defined in claim 1 wherein the arrangement further comprises a translational member coupled to the platform for assisting in the movement of the platform with respect to the structure.

8. The arrangement as defined in claim 7 wherein the translational member comprises one or more wheels attached to the platform.

* * * * *